(12) United States Patent
Liu et al.

(10) Patent No.: US 11,948,529 B2
(45) Date of Patent: Apr. 2, 2024

(54) DISPLAY PANEL WITH GOOD DISPLAY EFFECT AND METHOD OF DRIVING THE SAME, AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Xiaona Liu, Beijing (CN); Yu Ma, Beijing (CN); Weitao Chen, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/765,157

(22) PCT Filed: Mar. 31, 2021

(86) PCT No.: PCT/CN2021/084666
§ 371 (c)(1),
(2) Date: Mar. 30, 2022

(87) PCT Pub. No.: WO2022/205164
PCT Pub. Date: Oct. 6, 2022

(65) Prior Publication Data
US 2024/0005889 A1 Jan. 4, 2024

(51) Int. Cl.
*G09G 3/36* (2006.01)

(52) U.S. Cl.
CPC ......... *G09G 3/3688* (2013.01); *G09G 3/3614* (2013.01); *G09G 2320/0233* (2013.01); *G09G 2320/0247* (2013.01)

(58) Field of Classification Search
CPC .................................................... G09G 3/3688
See application file for complete search history.

(56) References Cited

U.S. PATENT DOCUMENTS 10,510,308 B2 * 12/2019 Mu ....................... G09G 3/3648
2008/0117154 A1   5/2008 Yeh
2016/0253946 A1 *  9/2016 Park ..................... G09G 3/3607
                                                          345/694
(Continued)

FOREIGN PATENT DOCUMENTS

CN      106067293 A   11/2016
CN      110379390 A   10/2019
(Continued)

*Primary Examiner* — Chun-Nan Lin
(74) *Attorney, Agent, or Firm* — IP & T GROUP LLP

(57) ABSTRACT

A display panel includes a plurality of sub-pixels and a plurality of gate lines. The plurality of sub-pixels are arranged in an array in a row direction and a column direction, and each row of sub-pixels includes sub-pixels of a first color, sub-pixels of a second color and sub-pixels of a third color. The plurality of gate lines includes first gate lines and second gate lines alternately arranged in the column direction, a first gate line and a second gate line adjacent to each other form a gate line pair, and two gate lines in the gate line pair are coupled to a same row of sub-pixels. In the same row of sub-pixels, sub-pixels of the first color are coupled to the first gate line.

16 Claims, 10 Drawing Sheets

(56) References Cited

U.S. PATENT DOCUMENTS

2016/0314736 A1* 10/2016 Sang .................... G09G 3/2085
2021/0056924 A1    2/2021 Xiao et al.

FOREIGN PATENT DOCUMENTS

| CN | 110456585 A | 11/2019 |
| CN | 110806668 A | 2/2020 |
| CN | 110879500 A | 3/2020 |
| CN | 110956921 A | 4/2020 |
| CN | 211348942 U | 8/2020 |

* cited by examiner

DISPLAY PANEL WITH GOOD DISPLAY EFFECT AND METHOD OF DRIVING THE SAME, AND DISPLAY APPARATUS

CROSS-REFERENCE TO RELATED APPLICATION

The present application is a national phase entry under 35 USC 371 of International Patent Application No. PCT/CN2021/084666, filed on Mar. 31, 2021, which is incorporated herein by reference in its entirety.

TECHNICAL FIELD

The present disclosure relates to the field of display technologies, and in particular, to a display panel and a method of driving the same, and a display apparatus.

BACKGROUND

A dual gate line technology is a driving technology that reduces the number of data lines by half and doubles the number of gate lines in a display apparatus. Compared with a display apparatus provided with a plurality of source driver integrated circuits and a plurality of gate driver integrated circuits generally, the display apparatus based on the dual gate line technology halves the number of source driver integrated circuits connected to the data lines and doubles the number of gate driver integrated circuits connected to the gate lines. Moreover, since a unit price of a gate driver integrated circuit is cheaper than a unit price of a source driver integrated circuit, cost reduction of the display apparatus is achieved.

SUMMARY

In an aspect, a display panel is provided. The display panel includes a plurality of sub-pixels and a plurality of gate lines. The plurality of sub-pixels are arranged in an array in a row direction and a column direction, and each row of sub-pixels includes sub-pixels of a first color, sub-pixels of a second color and sub-pixels of a third color. The plurality of gate lines includes first gate lines and second gate lines alternately arranged in the column direction, a first gate line and a second gate line adjacent to each other form a gate line pair, and two gate lines in the gate line pair are coupled to a same row of sub-pixels. In the same row of sub-pixels, sub-pixels of the first color are all coupled to the first gate line.

In some embodiments, in the same row of sub-pixels, sub-pixels with the second color are all coupled to the second gate line.

In some embodiments, the display panel further includes a plurality of data lines including first data lines and second data lines alternately arranged in the row direction. In the same row of sub-pixels, two adjacent sub-pixels form a sub-pixel pair, two sub-pixels in the sub-pixel pair are coupled to a same data line, and every two adjacent sub-pixel pairs are coupled to a first data line and a second data line. Different sub-pixels coupled to the same data line are coupled to different gate lines in the gate line pair. Sub-pixels located in a same column and having a same color include first sub-pixels and second sub-pixels alternately distributed. Each first sub-pixel is coupled to a first data line, and each second sub-pixel is coupled to a second data line.

In some embodiments, in a same column of sub-pixels, every two adjacent sub-pixels have different colors.

In some embodiments, in odd rows of sub-pixels, sub-pixels located in the same column have a same color; and in even rows of sub-pixels, sub-pixels located in the same column have a same color.

In some embodiments, the data line coupled to the sub-pixel pair is located between the two sub-pixels in the sub-pixel pair.

In some embodiments, in two sub-pixel pairs that are coupled to a same data line and located in two adjacent rows of sub-pixels, two sub-pixels in a sub-pixel pair are located in a j-th column and a (j+1)-th column, and two sub-pixels in another sub-pixel pair are located in a (j−1)-th column and the j-th column; and the (j−1)-th column, the j-th column and the (j+1)-th column are three consecutive columns.

In some embodiments, a data line of the plurality of data lines includes a plurality of data sub-lines connected in sequence, and each data sub-line is coupled to Q sub-pixel pairs located in different rows. i-th sub-pixel pairs each coupled to a data sub-line in the data line are located in the same two columns; i is in a range from 1 to Q, inclusive, and Q is greater than or equal to 2.

In some embodiments, Q is an even number greater than or equal to 4.

In some embodiments, Q is equal to 6.

In some embodiments, among the Q sub-pixel pairs coupled to each data sub-line, a k-th sub-pixel pair and a (Q−k+2)-th sub-pixel pair are located in the same two columns; k is in a range from 2 to Q/2, inclusive.

In some embodiments, the plurality of data lines are arranged in parallel.

In some embodiments, the display panel further includes a plurality of touch signal lines. At least one of the plurality of touch signal lines is arranged in parallel with a data line.

In some embodiments, the sub-pixels of the first color are red sub-pixels, the sub-pixels of the second color are green sub-pixels, and the sub-pixels of the third color are blue sub-pixels.

In some embodiments, the first data lines and the second data lines are configured to transmit data signals with different polarities.

In another aspect, a display apparatus is provided. The display apparatus includes the display panel as described in any of the above embodiments.

In yet another aspect, a method of driving the display panel is provided. The method includes: inputting gate driving signals to the plurality of gate lines in the display panel in a process where the display panel displays a frame of image to turn on the plurality of sub-pixels in the display panel row by row, so that the sub-pixels of the first color that are coupled to the first gate line of the plurality of gate lines are turned on simultaneously.

In some embodiments, the display panel further includes a plurality of data lines including first data lines and second data lines alternately arranged in the row direction. In the same row of sub-pixels, two adjacent sub-pixels form a sub-pixel pair, two sub-pixels in the sub-pixel pair are coupled to a same data line, and every two adjacent sub-pixel pairs are coupled to a first data line and a second data line; different sub-pixels coupled to the same data line are coupled to different gate lines in the gate line pair. Sub-pixels located in a same column and having a same color include first sub-pixels and second sub-pixels alternately distributed; each first sub-pixel is coupled to a first data line, and each second sub-pixel is coupled to a second data line. The method further includes inputting data signals to sub-pixels that are turned on in each row through the plurality of data lines. In the process where the display panel displays the frame of image, the first data lines and the second data lines transmit data signals with different polarities, and data signals transmitted by each data line of the plurality of data lines are in the same polarity.

In some embodiments, in a process where the display panel displays two adjacent frames of images, polarities of data signals transmitted by the same data line of the plurality of data lines are different.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on actual sizes of products, actual processes of methods and actual timings of signals of the embodiments of the present disclosure.

DETAILED DESCRIPTION

Figure 1:
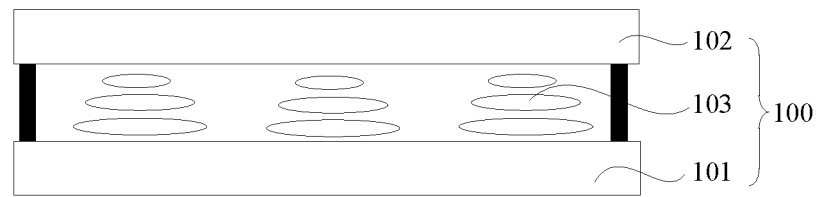
FIG. 1 is a sectional view of a display apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the term such as "one embodiment", "some embodiments", "exemplary embodiments", "example", "specific example" or "some examples" is intended to indicate that specific features, structures, materials or characteristics related to the embodiment(s) or example(s) are included in at least one embodiment or example of the present disclosure. Schematic representation of the above term does not necessarily refer to the same embodiment(s) or examples(s). In addition, the specific features, structures, materials or characteristics may be included in any one or more embodiments or examples in any suitable manner.

Hereinafter, the terms such as "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the terms "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if", depending on the context, is optionally construed as "when" or "in a case where" or "in response to determining" or "in response to detecting". Similarly, depending on the context, the phrase "if it is determined" or "if [a stated condition or event] is detected" is optionally construed as "in a case where it is determined" or "in response to determining" or "in a case where [the stated condition or event] is detected" or "in response to detecting [the stated condition or event]".

The use of the phrase "applicable to" or "configured to" herein means an open and inclusive expression, which does not exclude devices that are applicable to or configured to perform additional tasks or steps.

Additionally, the use of "based on" is meant to be open and inclusive, in that a process, step, calculation, or other action "based on" one or more recited conditions or values may, in practice, be based on additional conditions or value other than those recited.

Exemplary embodiments are described herein with reference to sectional views and/or plan views as idealized exemplary drawings. In the accompanying drawings, thicknesses of layers and sizes of regions are enlarged for clarity. Variations in shapes with respect to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

Among display apparatuses, a liquid crystal display (LCD) apparatus has characteristics of small size, low power consumption, low manufacturing cost, non-radiation and the like, and occupies a dominant position in the current market of display apparatuses. In a process of realizing image display by using the LCD apparatus, in order to prevent a failure of properties of liquid crystal molecules, alternating current is generally used for driving the LCD apparatus. Specifically, a data signal of the LCD apparatus changes positively and negatively by taking a common voltage as a reference, and in a case where a voltage of the data signal is greater than the common voltage, the data signal is in a positive polarity, otherwise it is in a negative polarity. When a frame of image is displayed, if a positive polarity data signal is written into a sub-pixel, the sub-pixel is in the positive polarity, and if a negative polarity data signal is written into a sub-pixel, the sub-pixel is in the negative polarity. At present, a common driving manner of the LCD apparatus includes a row inversion manner, a column inversion manner or a dot inversion manner. If the LCD apparatus is driven in the column inversion manner, polarities of data signals written into sub-pixels that are arranged at interval of the predetermined number of columns of sub-pixels are reversed in a process of displaying a frame of image.

For example, two adjacent columns of sub-pixels in the LCD apparatus using a dual gate line technology may share a data line. For the column inversion manner, in a process of displaying a frame of image, data signals on each data line are always in a same polarity (positive polarity or negative polarity), and polarities of data signals on two adjacent data lines are reversed. Thus, in the process of displaying the frame of image, polarities of data signals written into a plurality columns of sub-pixels arranged in a row direction are in a periodic cycle of positive, positive, negative and negative. Therefore, there is a phase difference of τ(180°) between data signals written into columns of sub-pixels coupled to two adjacent data lines, which serves to suppress the flickering to some extent. However, in the process of displaying the same frame of image, polarities of data signals written into two columns of sub-pixels coupled to each data line are the same, and there is no phase difference between data signals written into the two columns of sub-pixels, which is likely to cause line flickering in the column direction. Thus, it is necessary to change the polarity of the data signal on each data line in a next frame to suppress the flickering.

If a user is always watching display images, polarities of data signals written into the same column of sub-pixels in two adjacent frames are reversed, so that the line flickering in the column direction is suppressed. However, when the user is shaking his head, a frame of image may not be observed, resulting in a situation that line flickering in the column direction in a frame cannot be suppressed in a next frame, which may easily produce poor display such as a V-line. That is, when shaking his head, the user may observe that vertical stripes with periodic and alternate brightness and darkness appear on a display screen.

To solve this problem, some embodiments of the present disclosure provide a display apparatus. For example, the display apparatus may be: a display, a television, a billboard, a digital photo frame, a laser printer with a display function, a telephone, a mobile phone, a personal digital assistant (PDA), a digital camera, a portable camcorder, a viewfinder, a navigator, a vehicle display device, a splicing display device, a household appliance, an information inquiry device (e.g., a business inquiry device of departments such as an e-government department, a bank, a hospital and an electric power department), and monitor, etc.

In some embodiments of the present disclosure, referring to FIG. 1, the display apparatus includes a display panel 100. The display panel may be a liquid crystal display panel. For example, the display panel may be an advanced-super dimensional switching (AD-SDS) liquid crystal display panel, which has advantages of high transmittance, wide viewing angle, high aperture ratio, low chromatic aberration, low response time, no push mura and the like, and which further improves the picture quality, widens an application range, and has a wider application prospect. The display apparatus may further include a backlight module configured to provide backlight for the display panel 100.

For example, the display apparatus may further include driver chip(s). For example, the driver chip is a driver integrated circuit (IC), and the driver IC includes a source driver. The driver chip is configured to provide data signals for the display panel 100. Referring to FIG. 1, the display panel 100 may include an array substrate 101, an opposite substrate 102, and a liquid crystal layer 103 disposed between the array substrate 101 and the opposite substrate 102. In order to realize color display, the display panel 100 may further include a color filter layer. The color filter layer may be disposed on the opposite substrate 102, and in this case, the opposite substrate 102 provided with the color filter layer may be referred to as a color filter substrate.

Figure 2:
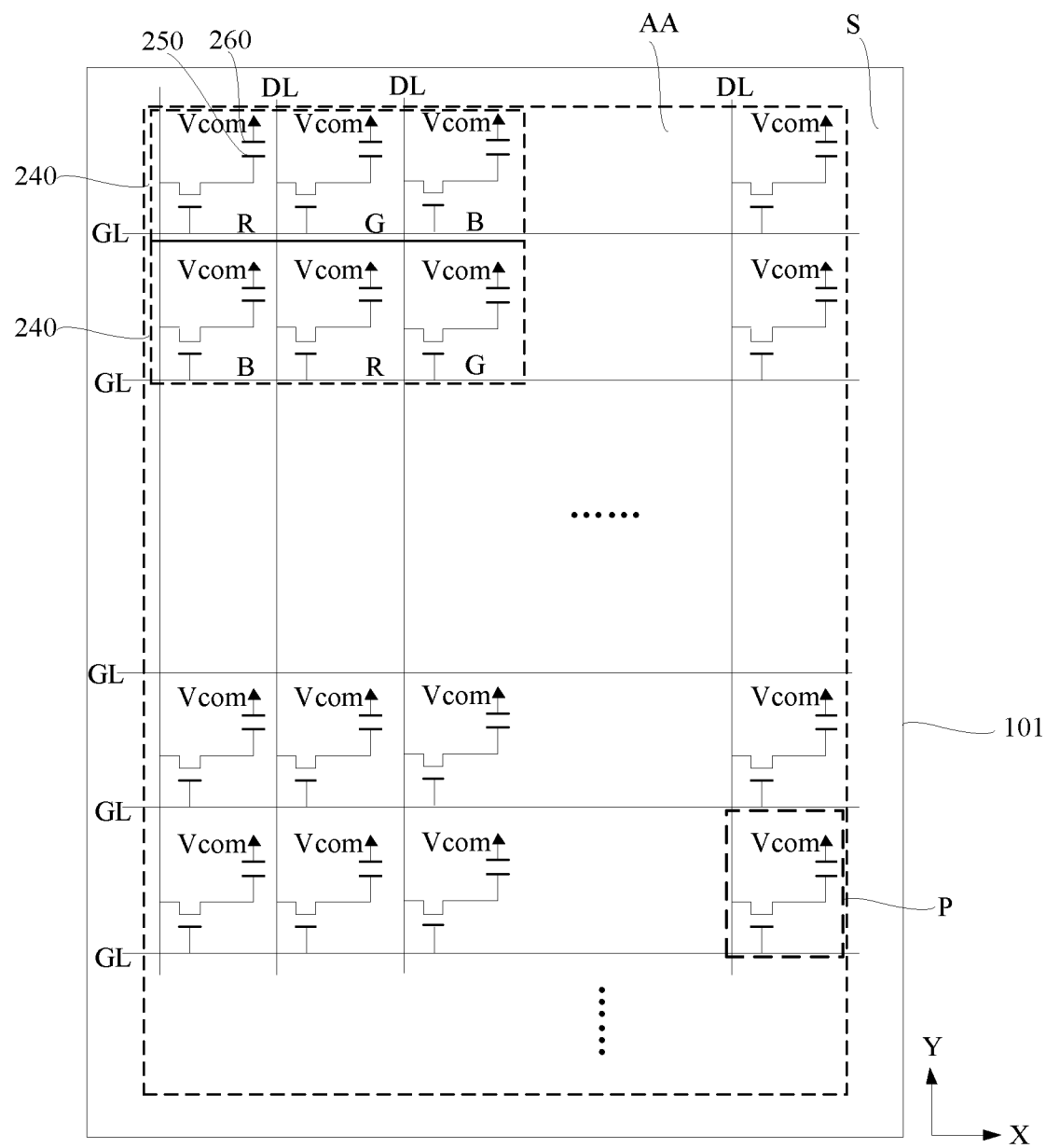
FIG. 2 is a structural diagram of a display panel, in accordance with some embodiments.

Referring to FIG. 2, the display panel has a display area AA and a peripheral area S. The peripheral area S is located on at least one side of the display area AA. For example, the peripheral area S may be provided around the display area AA.

In some embodiments of the present disclosure, referring to FIG. 2, the display panel 100 may include a plurality of sub-pixels P located in the display area AA and arranged in an array in the row direction and the column direction. For example, sub-pixels P arranged in a line in the row direction are referred to as sub-pixels in the same row, and sub-pixels P arranged in a line in the column direction are referred to as sub-pixels in the same column. The row direction is represented by X, and the column direction is represented by Y.

For example, each row of sub-pixels includes sub-pixels of a first color, sub-pixels of a second color and sub-pixels of a third color. For example, the first color, the second color and the third color are not limited and may be three primary colors or other colors. For example, the first color, the second color and the third color are blue, green and red, respectively. That is, the plurality of sub-pixels P include blue sub-pixels, green sub-pixels and red sub-pixels.

An arrangement of each row of sub-pixels P is not limited, and an arrangement of two adjacent rows of sub-pixels P is not limited, either. For example, a sub-pixel of the first color, a sub-pixel of the second color and a sub-pixel of the third color that are arranged adjacently in any order are a sub-pixel group. Each row of sub-pixels P may include a plurality of sub-pixel groups arranged repeatedly, and the arrangement of two adjacent rows of sub-pixels P may be the same or different. For example, in FIG. 2, the sub-pixel of the first color is a red sub-pixel R, the sub-pixel of the second color is a green sub-pixel G and the sub-pixel of the third color is a blue sub-pixel B; each row of sub-pixels P includes a plurality of sub-pixel groups 240 arranged repeatedly; in odd rows, each sub-pixel group 240 includes a red sub-pixel R, a green sub-pixel G and a blue sub-pixel B that are arranged in sequence; and in even rows, each sub-pixel group 240 includes a blue sub-pixel B, a red sub-pixel R and a green sub-pixel G that are arranged in sequence. For another example, arrangements of sub-pixels P in all rows are the same.

As shown in FIG. 2, each sub-pixel P may include a pixel electrode 250 and a common electrode 260. An electric field formed between the pixel electrode 250 and the common electrode 260 is applied to liquid crystal molecules in the sub-pixel P, so that the liquid crystal molecules in the sub-pixel P are arranged in a corresponding manner to control a light-emitting brightness of the sub-pixel P. In addition, each sub-pixel P further includes a switching device coupled to the pixel electrode 250. For example, the switching device may be a thin film transistor (TFT).

The pixel electrode 250 and the common electrode 260 may be disposed on a same side of the liquid crystal layer. For example, in the AD-SDS display panel, one of the pixel electrode and the common electrode that are included in the array substrate generally has slits. Upper and lower positions of the common electrode and the pixel electrode may be changed. A direction and an angle of the slit may be set as needs. For example, in order to achieve a high aperture ratio, the slit is set to be parallel to a data line. Alternatively, the pixel electrode 250 and the common electrode 260 may be disposed on opposite sides of the liquid crystal layer. The display panel 100 (e.g., the array substrate in the display panel 100) further includes a plurality of gate lines GL and a plurality of data lines DL. The gate lines GL may be used to transmit gate driving signals (also referred to as scanning signals) to turn on the plurality of sub-pixels P in the display panel 100 row by row; and the data lines DL are configured to provide data signals for sub-pixels P that are turned on. For example, in each sub-pixel P, a gate of the thin film transistor is coupled to a gate line, a first electrode (e.g., a source) is coupled to a data line, and a second electrode (e.g., a drain) is coupled to the pixel electrode. Therefore, turning on or off of the thin film transistor determines whether a data signal from the data line is written into the pixel electrode. For example, the display panel 100 may further include a gate driver on array (GOA) circuit connected to the gate lines GL for providing gate driving signals to the gate lines GL. The GOA circuit includes a plurality of GOA units, which are coupled to the gate lines GL in a one-to-one correspondence.

Referring to FIGS. 4 to 10, embodiments of the present disclosure provide structural diagrams of array substrates in a plurality of display panels. Patterns where R, G and B are located represent a pixel electrode in a red sub-pixel, a pixel electrode in a green sub-pixel and a pixel electrode in a blue sub-pixel in the display panel, respectively.

Figure 3:
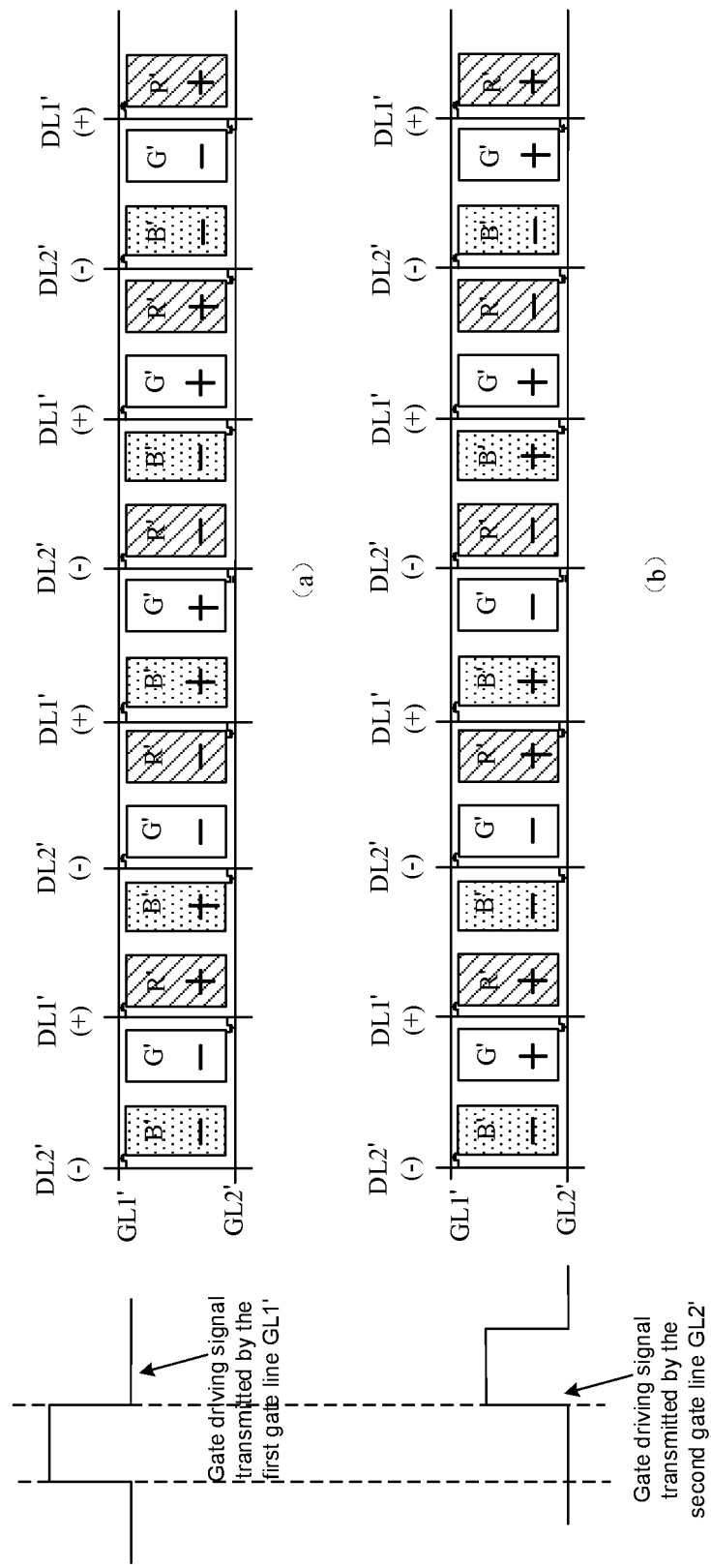
FIG. 3 is a diagram showing that sub-pixels with a same color in a same row are connected to different gate lines.

Referring to FIGS. 4 to 10, the plurality of gate lines include first gate lines GL1 and second gate lines GL2 alternately arranged in the column direction Y. A first gate line GL1 and a second gate line GL2 adjacent to each other form a gate line pair 220, and two gate lines in a same gate line pair 220 are coupled to a same row of sub-pixels P. For example, the two gate lines GL in the same gate line pair 220 may be located on both sides of the same row of sub-pixels P coupled thereto in the column direction. That is, a row of sub-pixels P is located between two gate lines GL in a gate line pair 220 coupled thereto. For another example, the two gate lines in the same gate line pair 220 may be located on a same side of the same row of sub-pixels P coupled thereto in the column direction. For example, referring to FIG. 4, in the same row of sub-pixels P, all sub-pixels of the first color are coupled to a first gate line GL1. In this way, the sub-pixels of the first color in the same row are turned on by one first gate line GL1. The first gate line GL1 inputs a gate driving signal to sub-pixels P coupled thereto in the same row to turn on the sub-pixels P, and the sub-pixels P receive data signals transmitted by the data lines DL, and display corresponding colors under driving of the data signals. FIG. 3 shows a case where sub-pixels of a same color located in the same row are turned on by different gate lines. In an example where the sub-pixel of the first color is the red sub-pixel R', some of red sub-pixels R' in the same row are turned on by the first gate line GL1', and remaining red sub-pixels R' in the row are turned on by the second gate line GL2'. Since there is a time difference between gate driving signals transmitted by the first gate line GL1' and the second gate line GL2' that are used to turn on sub-pixels in the same row during an actual driving process, all the red sub-pixels R' in the same row cannot be turned on simultaneously. Referring to (a) in FIG. 3, a plurality of red sub-pixels R' coupled to the first gate line GL1' in the same row are turned on first, and display colors of the plurality of red sub-pixels R' are updated under the driving of data signals transmitted by data lines DL1' and data lines DL2'; referring to (b) in FIG. 3, a plurality of red sub-pixels R' coupled to the second gate line GL2' are turned on later and display colors of the plurality of red sub-pixels R' are updated under the driving of data signals transmitted by data lines DL1' and data lines DL2'. There is a time difference in the update of the display colors of all the red sub-pixels R' in the same row, resulting in a difference in the display colors of sub-pixels of the same color in the same row at the same time and further resulting in display flickering in the row direction, which has an adverse effect on the display effect.

However, in the embodiments of the present disclosure, in the same row of sub-pixels P, all sub-pixels of the first color are coupled to one first gate line GL1. In this way, the first color sub-pixels in the same row may be turned on simultaneously by the first gate line GL1, and display colors of the sub-pixels of the first color may be updated simultaneously under the driving of the data signals. Thus, a display flickering problem of a certain color in the same row is avoided, and the display effect is good.

For example, referring to FIGS. 4 to 10, in the same row of sub-pixels P, all sub-pixels of the second color (e.g. green sub-pixels G) are coupled to a second gate line GL2. This connection arrangement may play a role similar to the above connection arrangement of the sub-pixels of the first color, and will not be repeated here.

Referring to FIGS. 4 to 10, the plurality of data lines DL include first data lines DL1 and second data lines DL2 alternately arranged in the row direction X, and the first data lines DL1 and the second data lines DL2 are configured to transmit data signals with different polarities.

In the same row of sub-pixels P, referring to FIGS. 4 to 10, two adjacent sub-pixels P form a sub-pixel pair 230, two sub-pixels P in a same sub-pixel pair 230 are coupled to a same data line DL. Every two adjacent sub-pixel pairs 230 are coupled to a first data line DL1 and a second data line DL2, and different sub-pixels P coupled to the same data line DL are coupled to different gate lines GL. For example, relative positions of sub-pixel pairs 230 and the data lines DL are not limited as long as the above connection relationship may be achieved. For example, in the row direction, two adjacent sub-pixel pairs 230 may be located between the first data line DL1 and the second data line DL2 coupled thereto. For another example, in the row direction, a position distribution of two adjacent sub-pixel pairs 230 and the first data line DL1 and the second data line DL2 that are coupled thereto is: a sub-pixel pair 230, the first data line DL1, the second data line DL2 and another sub-pixel pair 230.

In a case where the sub-pixel of the first color is the red sub-pixel R, the sub-pixel of the second color is the green sub-pixel G, and the sub-pixel of the third color is the blue sub-pixel B, in the same row of sub-pixels P, sub-pixels of the first color are coupled to a first gate line GL1, sub-pixels of the second color are coupled to a second gate line GL2, and different sub-pixels P coupled to the same data line DL are coupled to different gate lines GL. For example, referring to FIGS. 4 to 10, in the same row of sub-pixels P, red sub-pixels R are coupled to the first gate line GL1, green sub-pixels G are coupled to the second gate line GL2, and blue sub-pixels B are alternately coupled to the first gate line GL1 and the second gate line GL2 in sequence. Since the blue sub-pixel B has a lowest light-emitting brightness and has a least impact on uniformity of the light-emitting brightness compared with the red sub-pixel R and the green sub-pixel G, an influence of sub-pixels P with different colors on the uniformity of the light-emitting brightness of the display panel 100 may be minimized through the above arrangement.

Figure 4:
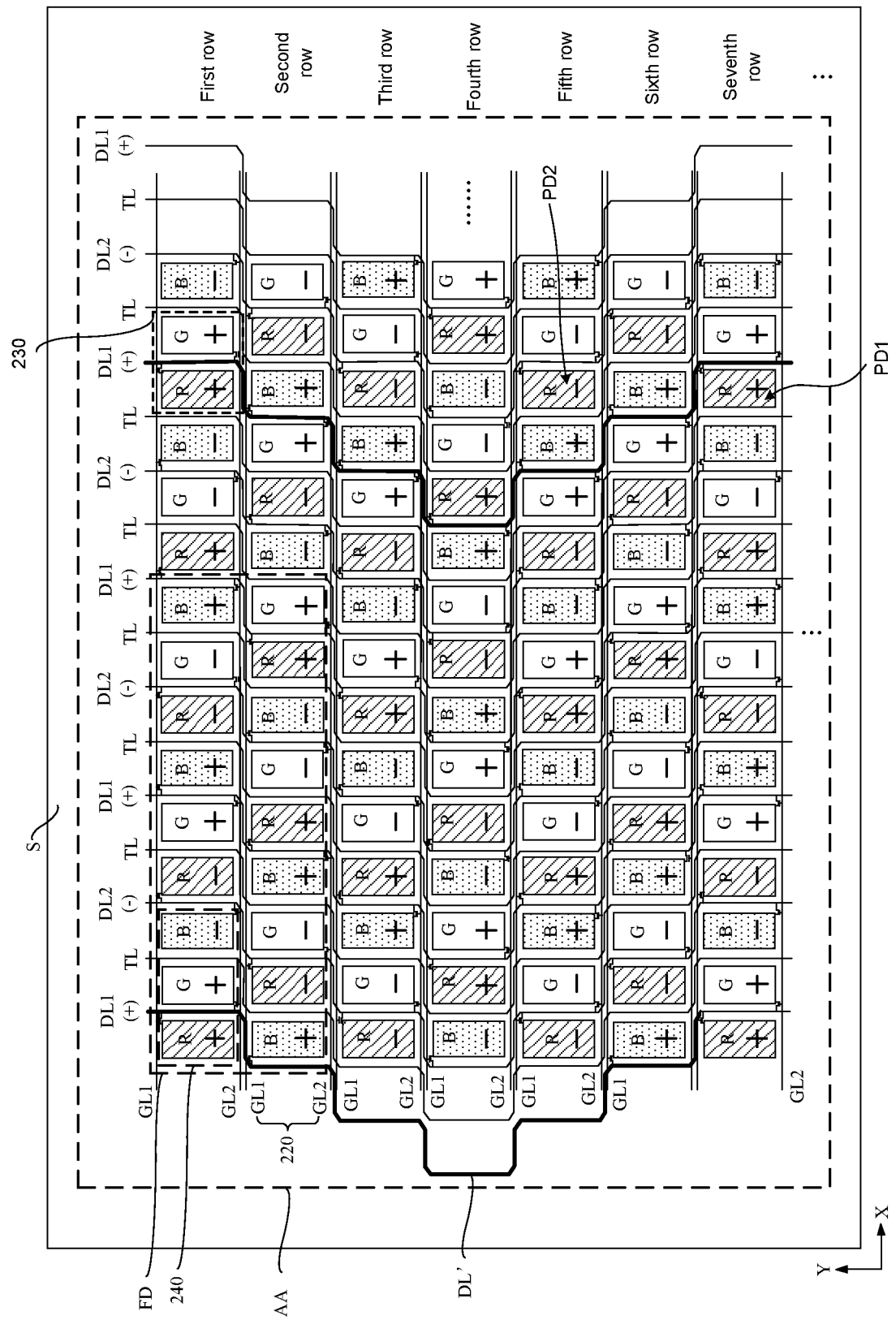
FIG. 4 is a structural diagram of an array substrate, in which Q is equal to 6 and two adjacent sub-pixels in a same column have different colors, in a display panel, in accordance with some embodiments.

Referring to FIGS. 4, a plurality of sub-pixels P located in the same column and having the same color include first sub-pixels PD1 and second sub-pixels PD2 that are alternately distributed. Each first sub-pixel PD1 is coupled to a first data line DL1, and each second sub-pixel PD2 is coupled to a second data line DL2. That is, in the display panel 100, one or more data lines DL (e.g., data lines DL) are not signal lines extending linearly in the column direction, but signal lines having bends. For example, the first data lines DL1 and the second data lines DL2 are not signal lines extending linearly in the column direction, but signal lines having bends, so that some of sub-pixels P of the same color in the same column are coupled to the first data line DL1, and the rest are coupled to the second data line DL2. Since polarities of data signals transmitted by the first data line DL1 and the second data line DL2 are different, polarities of sub-pixels P of the same color in the same column that are coupled to the first data line DL1 and the second data line DL2 are also different. Alternating distribution means that the sub-pixels P of the same color in the same column have both positive polarities and negative polarities, and some sub-pixels P (at least one sub-pixel P) with the positive polarity and some sub-pixels P (at least one sub-pixel P) with the negative polarity are alternately distributed in a process of displaying a frame of image. The alternating distribution may be repeated periodically, or may be arranged in any manner, which is not limited. For example, for the red sub-pixels, the alternating distribution means that in a process of displaying a frame of image, referring to FIG. 4, polarities of red sub-pixels located in the same column in the column direction are positive, negative and negative in sequence, which is repeated periodically. For another example, referring to FIG. 6, the polarities of the red sub-pixels located in the same column in the column direction are positive and negative in sequence, which is repeated periodically.

For a same sub-pixel P, in a case where polarities of input data signals are different, light-emitting brightness of the sub-pixel P will be different. However, the above arrangement in which data signals are input in the column inversion manner may achieve a display effect similar to an arrangement in which data signals are input in the dot inversion manner. In a process of displaying each frame of image, polarities of sub-pixels P of the same color in the same row may be positive, positive, negative and negative, which is cycled periodically, and polarities of sub-pixels P of the same color in the same column may be mixed with positive and negative polarities. Thus, for each sub-pixel P in the display area AA, brightness may be uniform in the row and column directions in each frame, so as to achieve a good display effect. Therefore, when a polarity of the same sub-pixel P is reversed in two adjacent frames, the display flickering problem due to the same polarity of sub-pixels of the same color in partial areas will not occur.

For example, a data line DL coupled to a sub-pixel pair 230 is located between two sub-pixels P in the sub-pixel pair 230. For example, referring to FIG. 4, in the row direction, a position distribution of two adjacent sub-pixel pairs 230 and the first data line DL1 and the second data line DL2 coupled thereto is that the first data line DL1 is located between two sub-pixels P in the sub-pixel pair 230 coupled thereto, and the second data line DL2 is located between two sub-pixels P in the sub-pixel pair 230 coupled thereto. In this way, the data line DL may be coupled to the two sub-pixels P in the pixel pair 230 without winding, which may simplify a wiring solution and facilitate the control of production cost.

For example, in two sub-pixel pairs that are coupled to the same data line and located in two adjacent rows of sub-pixels, two sub-pixels P in a sub-pixel pair 230 are located in a j-th column and a (j+1)-th column, and two sub-pixels P in the other sub-pixel pair 230 are located in a (j−1)-th column and the j-th column. The (j−1)-th column, the j-th column and the (j+1)-th column are three consecutive columns, where j is a positive integer. That is, a shape of the data line DL in a range of at least two rows (e.g., a plurality of rows) is that each time the data line DL extends downwards one row in the column direction, it continues to extend across one sub-pixel P leftward or rightward in the row direction. For example, referring to FIGS. 4 to 7, in a range of a first row to a fourth row of the display panel 100, each time the data line DL extends downwards one row in the column direction, it extends across one sub-pixel P leftward in the row direction, and repeats the above routing manner. In this way, there are only three signal lines, i.e., one first gate line GL1, one second gate line GL2 and one data line DL, between two adjacent sub-pixels P in the same column, and a distance between the two adjacent sub-pixels P is small, which is beneficial to increasing a pixel density per unit area and realizing a high display resolution.

Figure 10:
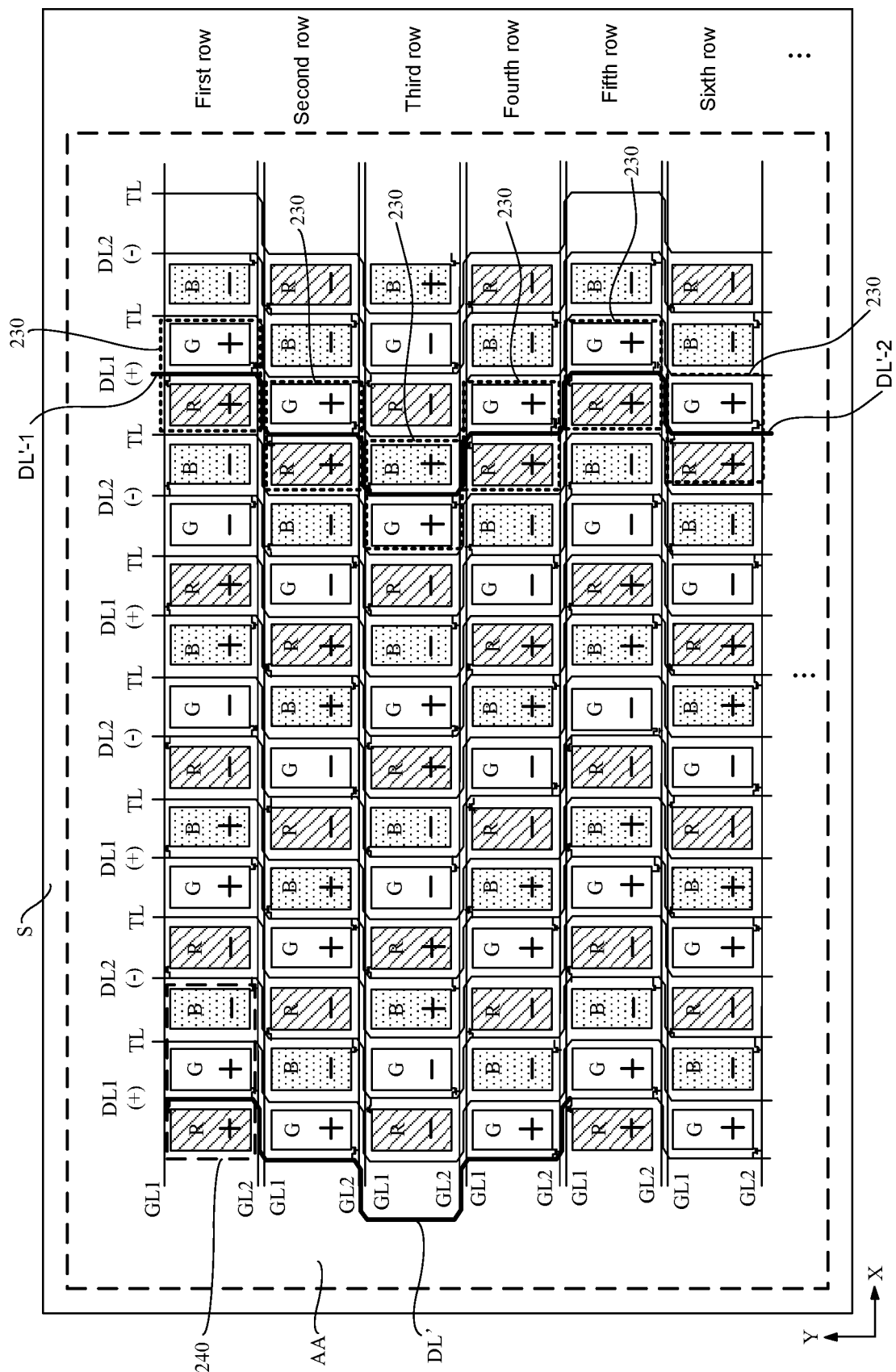
FIG. 10 is a structural diagram of yet another array substrate in which Q is equal to 4 and two adjacent sub-pixels in the same column have different colors, in accordance with some embodiments.

For example, a data line DL of the plurality of data lines DL includes a plurality of data sub-lines DL' connected in sequence. Each data sub-line DL' is coupled to Q sub-pixel pairs 230 located in different rows, and i-th sub-pixel pairs 230 each coupled to a data sub-line DL' in the data line DL are located in the same two columns, where i is in a range from 1 to Q, inclusive (i∈[1,Q]), and Q is greater than or equal to 2. For example, referring to FIG. 10, in a case where Q is equal to 4, each data sub-line DL' is coupled to four sub-pixel pairs 230 located in different rows. That is, an extension range of each data sub-line DL' is four rows, a sub-pixel pair 230 located in an i-th row within the extension range of each data sub-line DL' is an i-th sub-pixel pair 230 coupled to the data sub-line DL', and i is equal to 1, 2, 3 or 4. Referring to FIG. 10, an extension range of a data sub-line DL'-1 in a data line DL is from the first row to the fourth row of the display panel, and an extension range of a data sub-line DL'-2 in the data line DL is from a fifth row to an eighth row of the display panel. It can be seen from FIG. 10 that, in a case where i is equal to 1, a first sub-pixel pair 230 (i.e., a sub-pixel pair 230 in the first row of the display panel) coupled to the data sub-line DL'-1 and a first sub-pixel pair 230 (i.e., a sub-pixel pair 230 in the fifth row of the display panel) coupled to the data sub-line DL'-2 are located in the same two columns; and in a case where i is equal to 2, a second sub-pixel pair 230 (i.e., a sub-pixel pair 230 in a second row of the display panel) coupled to the data sub-line DL'-1 and a second sub-pixel pair 230 (i.e., a sub-pixel pair 230 in a sixth row of the display panel) coupled to the data sub-line DL'-2 are located in the same two columns.

Figure 5:
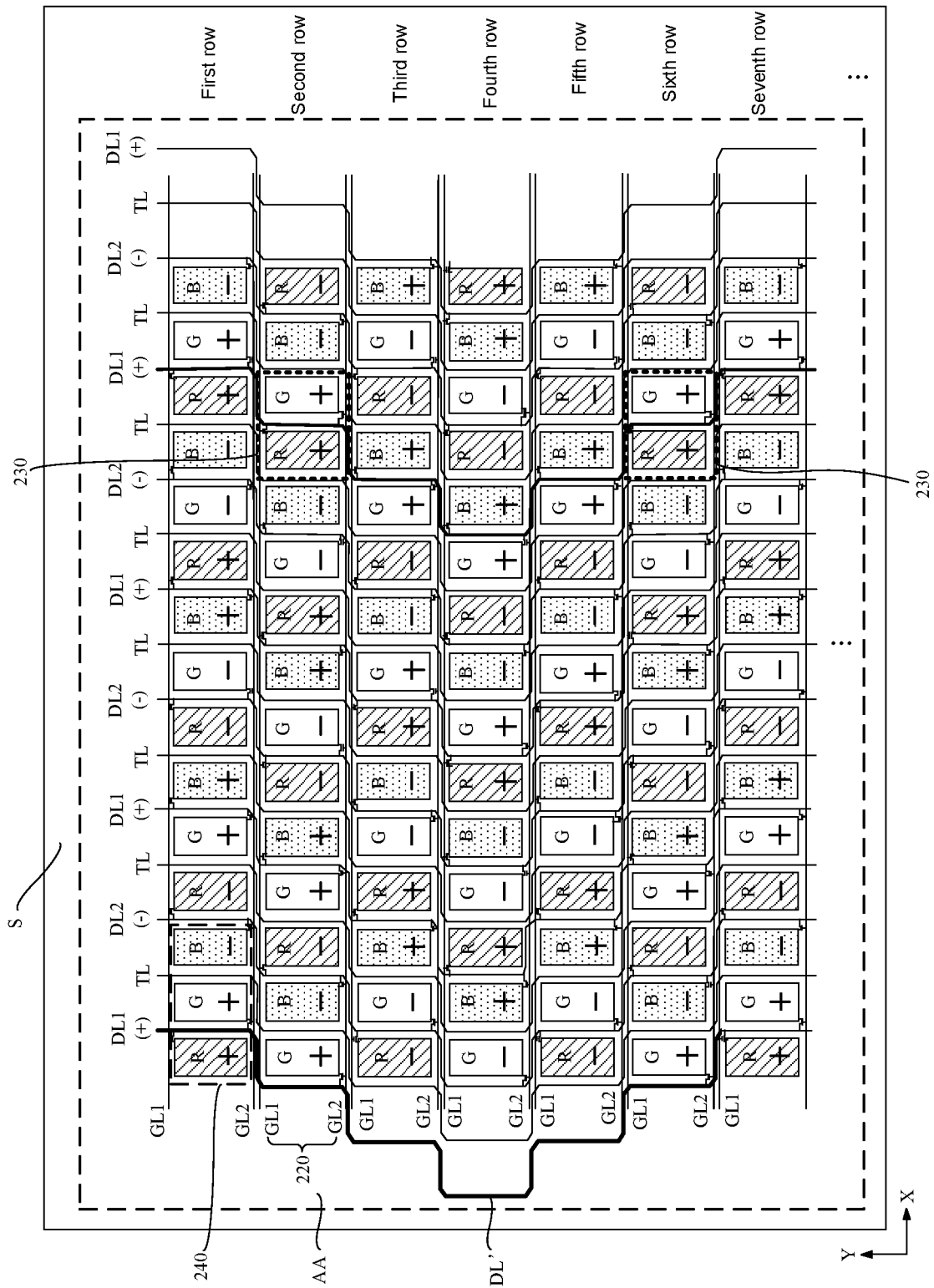
FIG. 5 is a structural diagram of another array substrate in which Q is equal to 6 and two adjacent sub-pixels in a same column have different colors, in accordance with some embodiments.
Figure 6:
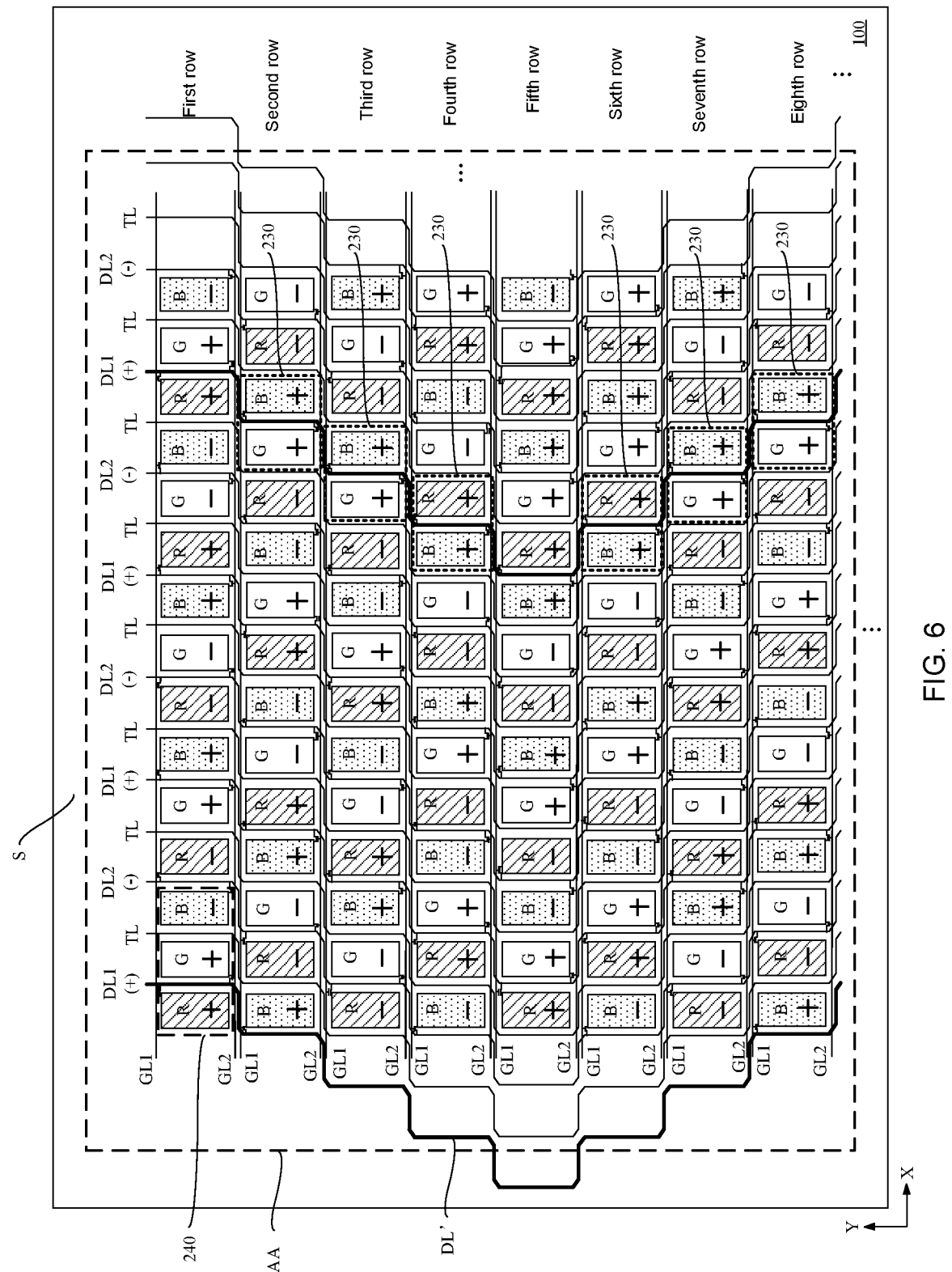
FIG. 6 is a structural diagram of yet another array substrate in which Q is equal to 8 and two adjacent sub-pixels in a same column have different colors, in accordance with some embodiments.
Figure 7:
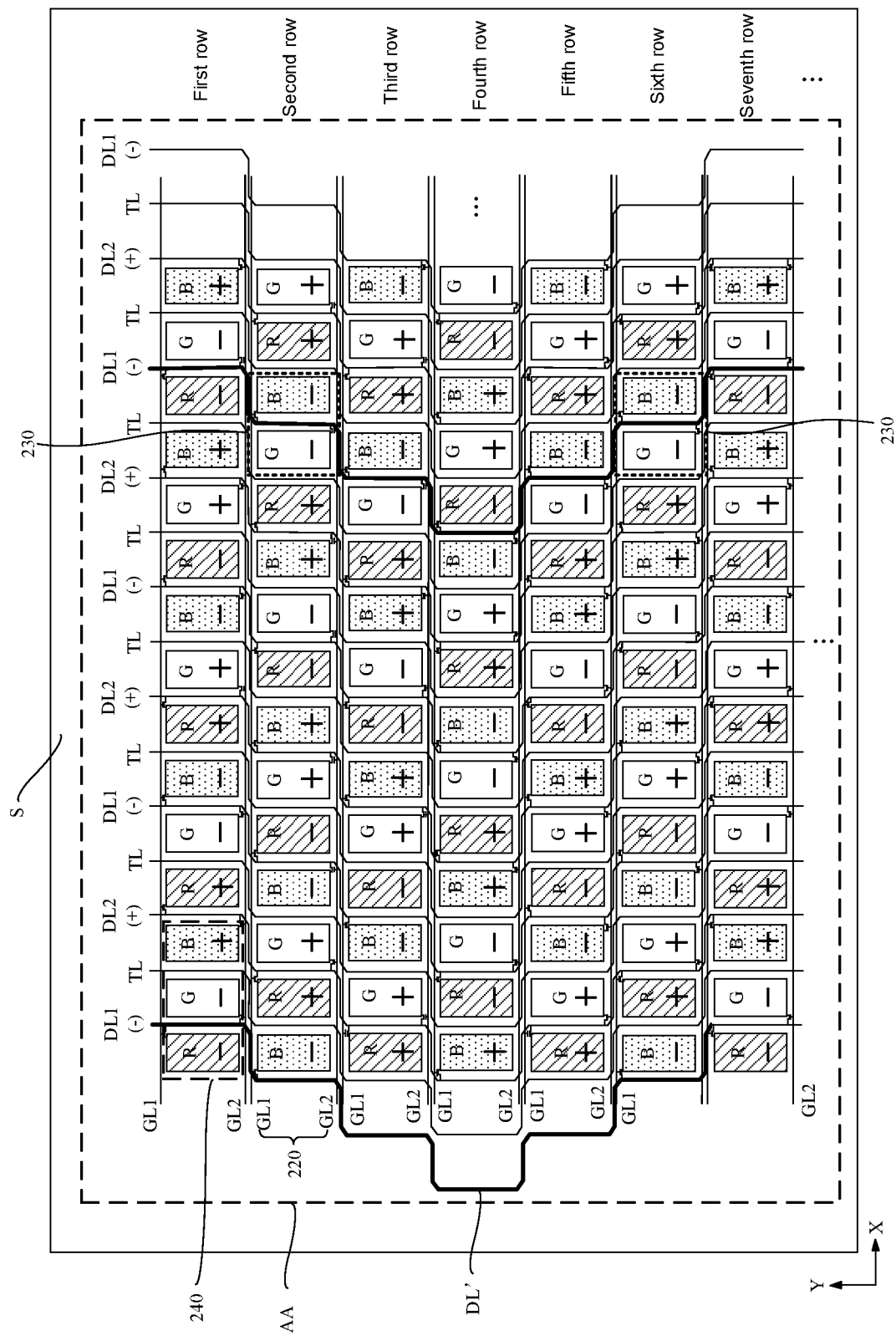
FIG. 7 is a diagram of the array substrate in FIG. 4 with polarities of data signals transmitted by data lines reversed.

For example, Q is an even number greater than or equal to 4. In this case, among the Q sub-pixel pairs 230 coupled to each data sub-line DL', a k-th sub-pixel pair 230 and a (Q−k+2)-th sub-pixel pair 230 are located in same two columns, where k is in a range from 2 to Q/2, inclusive (k∈[2, Q/2]). For example, Q is equal to 6. In a case where Q is equal to 6, k is in a range from 2 to 3, inclusive. Referring to FIGS. 4, 5 and 7, in a case where the k is equal to 2, a second sub-pixel pair 230 and a sixth sub-pixel pair 230 that are coupled to a same data sub-line DL' are located in the same two columns; and in a case where the k is equal to 3, a third sub-pixel pair 230 and a fifth sub-pixel pair 230 that are coupled to a same data sub-line DL' are located in the same two columns. In a case where the Q is equal to 6, a winding length of each data line DL in the display panel 100 is short, so that sub-pixels P of the same color in each row have moderate light-emitting brightness to achieve a good display effect. For another example, referring to FIG. 10, in the case where Q is equal to 4, a second sub-pixel pair 230 and a fourth sub-pixel pair 230 that are coupled to a same data sub-line DL' are located in the same two columns. For yet another example, referring to FIG. 6, in a case where Q is equal to 8, a second sub-pixel pair 230 and an eighth sub-pixel pair 230 that are coupled to a same data sub-line DL' are located in the same two columns, and a third sub-pixel pair 230 and a seventh sub-pixel pair 230 that are coupled to the same data sub-line DL' are located in the same two columns, and a fourth sub-pixel pair 230 and a sixth sub-pixel pair 230 that are coupled to the same data sub-line DL' are located in the same two columns.

For example, in the same column of sub-pixels P, colors of every two adjacent sub-pixels P are different, and arrangements of two adjacent rows of sub-pixels P are different. For example, a plurality of sub-pixels P in the same column may be arranged periodically and repeatedly, and an arrangement period may be 2 rows, 3 rows, 4 rows or others, which are not limited. For example, in a case where the period is 2 rows, in odd rows of sub-pixels, sub-pixels located in the same column have the same color; and in even rows of sub-pixels, sub-pixels located in the same column have the same color. For example, referring to FIGS. 4 to 10, the sub-pixel group 240 includes the red sub-pixel R, the green sub-pixel G and the blue sub-pixel B. Each row of sub-pixels P includes the plurality of sub-pixel groups 240 arranged repeatedly. In addition, the arrangement period of the plurality of sub-pixels P in the same column is 2 rows. In this case, the first column is taken as an example, two sub-pixels P located in odd rows have the same color, two sub-pixels P located in even rows also have the same color, and two sub-pixels P in any two adjacent rows have different colors.

For example, referring to FIG. 4, in the case where Q is equal to 6, a shape of the data sub-line DL' and an arrangement of the sub-pixel groups 240 are as described above, and the arrangement period of the plurality of sub-pixels P is 2 rows, sub-pixels P with the same color and different polarities in the same row and the same column are uniformly arranged, and there is no case where polarities of all sub-pixels P with the same color in the same column are the same, so that the brightness may be uniform and a good display effect may be achieved.

Figure 8:
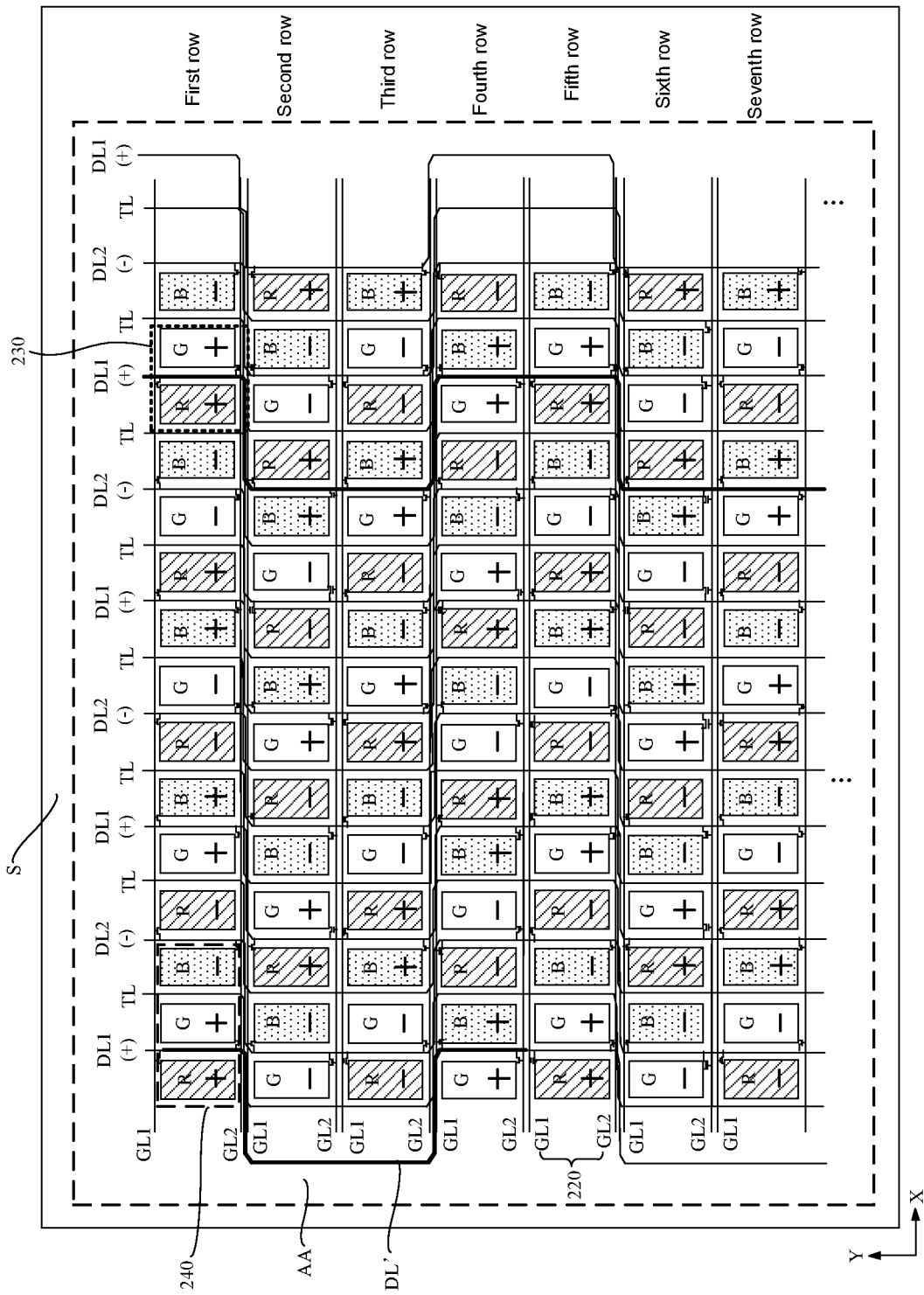
FIG. 8 is a structural diagram of yet another array substrate in which Q is equal to 4 and two adjacent sub-pixels in the same column have different colors, in accordance with some embodiments.
Figure 9:
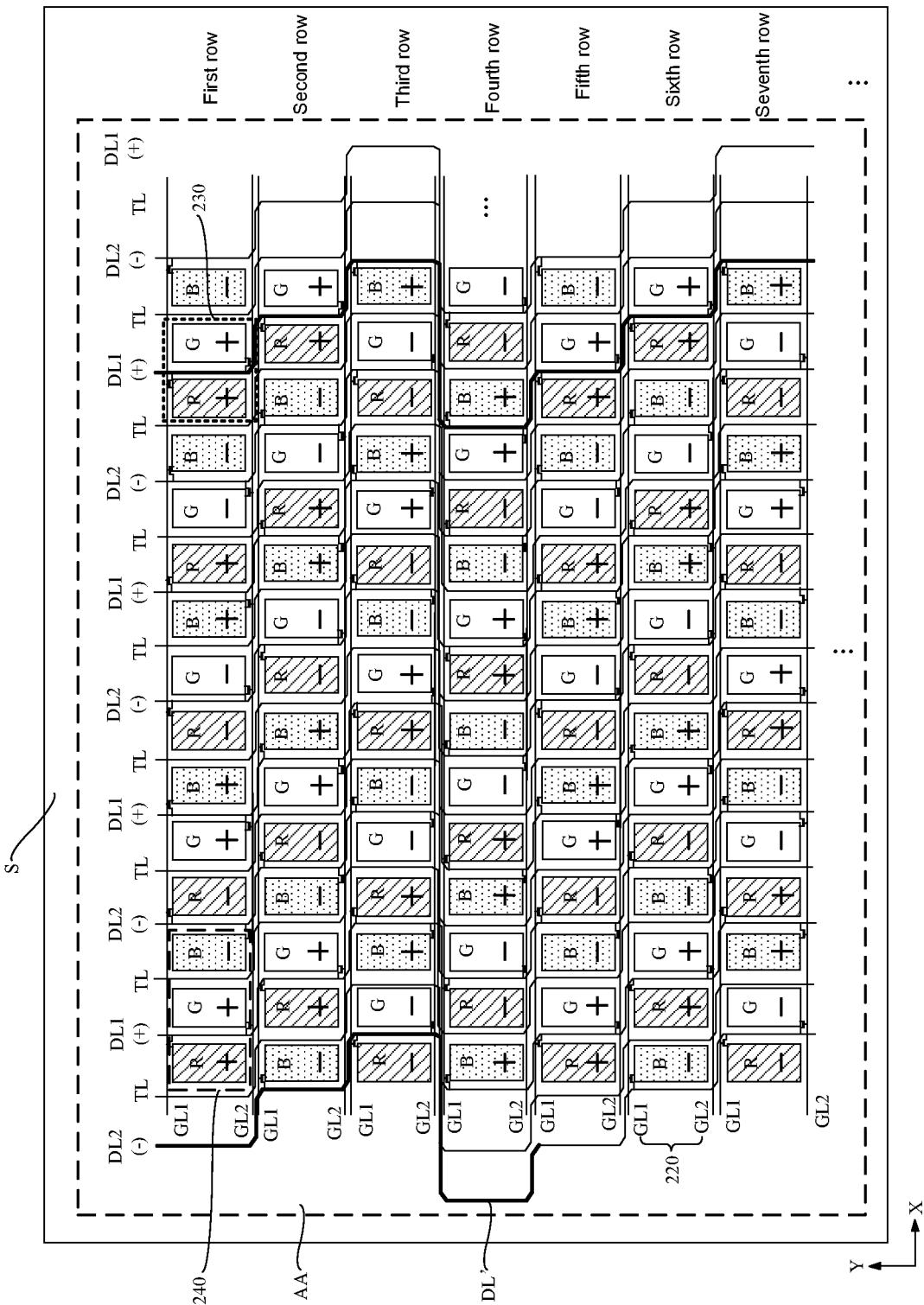
FIG. 9 is a structural diagram of yet another array substrate in which Q is equal to 4 and two adjacent sub-pixels in the same column have different colors, in accordance with some embodiments.

The shape of the data sub-line DL' and a distribution range of the data sub-line DL' in the display panel 100 are not limited. A plurality of data sub-lines DL' parallel to one another may be arranged in the whole display area AA; or a plurality of data sub-lines DL' parallel to one another may be arranged only in a portion of the display area AA, and an arrangement of data lines DL at other positions of the display area AA is still a conventional linear extension arrangement. For example, the shape of the data sub-line DL' may be as shown in FIGS. 4, 5 and 7, in which Q is equal to 6; in a range from the first row to the third row, each time the data sub-line DL' extends downward one row in the column direction, it extends across one sub-pixel P leftward; and in a range from the fourth row to the sixth row, each time the data sub-line DL' extends downward one row in the column direction, it extends across one sub-pixel P rightward. For another example, the shape of the data sub-line DL' may be as shown in FIG. 6, in which Q is equal to 8; in a range from the first row to the fourth row, each time the data sub-line DL' extends downward one row in the column direction, it extends across one sub-pixel P leftward; and in a range from the fifth row to the eighth row, each time the data sub-line DL' extends downward one row in the column direction, it extends across one sub-pixel P rightward. For yet another example, the shape of the data sub-line DL' may be as shown in FIG. 8, in which the Q is equal to 4; in a range from the first row to the fourth row, the data sub-line DL' extends downward one row in the column direction first, then extends across two sub-pixels P leftward in the row direction and extends downward two rows in the column direction, and then extends across two sub-pixels P rightward in the row direction and extends downward one row in the column direction. For yet another example, the shape of the data sub-line DL' may be as shown in FIG. 9, in which the Q is equal to 4; in a range from the first row to the second row, each time the data sub-line DL' extends downward one row in the column direction, it extends across one sub-pixel P rightward in the row direction; in a range of the third row, the data sub-line DL' extends downward one row in the column direction and then extends across three sub-pixel P leftward in the row direction; and in a range of the fourth row, the data sub-line DL' extends downward one row in the column direction and then extends across one sub-pixel P rightward in the row direction. For yet another example, the shape of the data sub-line DL' may be as shown in FIG. 10, in which the Q is equal to 4; in a range from the first row to the second row, each time the data sub-line DL' extends downward one row in the column direction, it extends across one sub-pixel P leftward in the row direction; and in a range from the third row to the fourth row, each time the data sub-line DL' extends downward one row in the column direction, it extends across one sub-pixel P rightward in the row direction. Beneficial effects achieved by arrangements of the data sub-line DL' described above are same as the beneficial effects of the foregoing embodiments, and will not be repeated here.

For example, the plurality of data lines DL are arranged in parallel. Shapes (i.e., wiring manners) of the plurality of data lines DL in the display panel 100 are the same. The above arrangement may make lengths of the data lines DL in the display panel 100 be the same and resistance values of the data lines DL be equal, so that light-emitting brightness of the sub-pixels P of the same color in each row is the same, and the display effect is good.

The display panel 100 may also have a touch function. Touch technologies commonly used in the related art to realize touch include an on-cell touch technology and an in-cell touch technology. In the embodiments of the present disclosure, the in-cell touch technology may be used to realize the touch function of the display panel 100.

For example, the display panel 100 further includes a plurality of touch signal lines TL. At least one (e.g., a plurality of) of the touch signal lines is arranged in parallel with a data line DL. Referring to FIGS. 4 to 10, an example is described in which the touch signal lines TL are arranged in parallel with the data lines DL. For example, the touch signal lines TL may be disposed in a same layer as the data lines DL, and shapes (i.e., wiring manners) of the touch signal lines TL are same as that of the data lines DL. Through the above arrangement, the touch signal lines TL and the data lines DL may be formed through a patterning process, and the display panel 100 with uniform light-emitting brightness and touch function may be obtained, which may simplify a manufacturing process. For another example, the display panel 100 may be a self-capacitance touch display panel, and common electrodes 260 are coupled to the touch signal lines. In a display phase, the touch signal lines provide common electrode driving signals for the common electrodes 260. In a non-display phase, the touch signal lines provide touch signals for the common electrodes 260, and the common electrodes 260 are also used as touch electrodes. Through the above arrangement, the touch signal lines TL and the data lines DL may be formed through a patterning process, and the display panel 100 with uniform light-emitting brightness and touch function may be obtained, which may simplify the manufacturing process.

Figure 11:
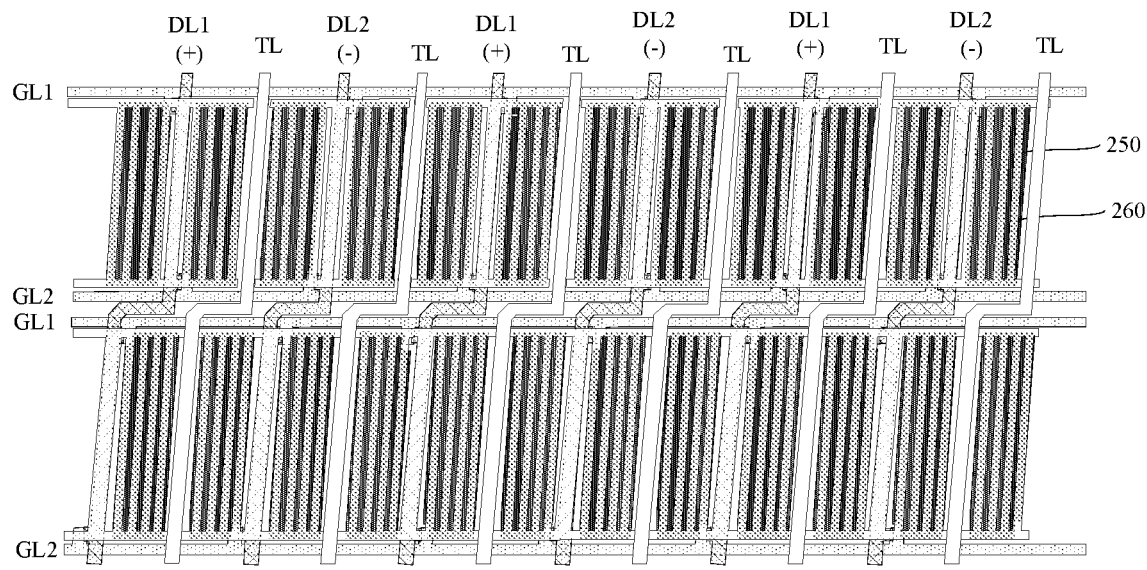
FIG. 11 is an enlarged structural diagram of the FD area in FIG. 4.

For example, the pixel electrodes 250 and the common electrodes 260 are disposed in the array substrate 101, and the common electrodes 260 are closer to the liquid crystal layer 103 than the pixel electrodes 250. Referring to FIG. 11, the pixel electrodes 250 are planar pixel electrodes, and the common electrodes 260 are provided with a plurality of slits therein, and a part of the slits correspond to the pixel electrodes 250 to form fringe electric fields, and another part of the slits correspond to the data lines DL, thereby reducing interference of other signals on the data signals. There is no overlapping region between orthogonal projections of the slits on the opposite substrate 102 and orthogonal projections of the gate lines GL1 and GL2 on the opposite substrate 102, which is beneficial to avoiding generation of parasitic capacitances, thereby avoiding signal delay on the gate lines. There are only three signal lines, i.e., one first gate line GL1, one second gate line GL2 and one data line DL, or one first gate line GL1, one second gate line GL2 and the touch signal line TL, between two adjacent sub-pixels P in the same column, and a distance between the two adjacent sub-pixels P is small, which is beneficial to increasing a pixel density per unit area and realizing a high display resolution.

Based on the above display panel 100, some embodiments of the present disclosure provide a method of driving a display panel. An executive subject may be the display panel 100 or a product including the display panel 100.

Figure 12:
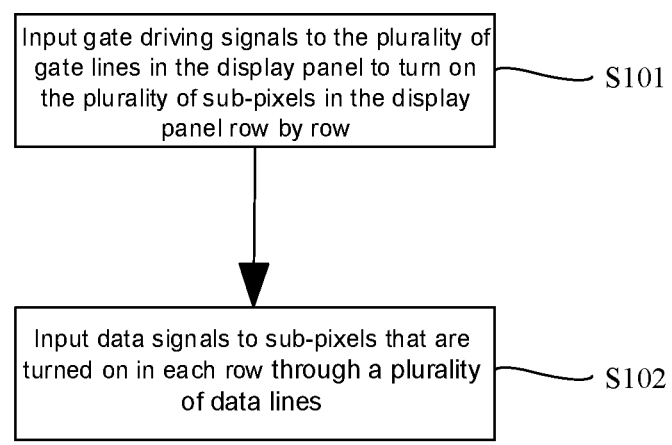
FIG. 12 is a step diagram of a method of driving a display panel, in accordance with some embodiments.

Referring to FIG. 12, the method may include following steps.

In S101, gate driving signals are input to the plurality of gate lines in the display panel to turn on the plurality of sub-pixels in the display panel row by row.

In a process where the display panel displays a frame of image, GOA units in a GOA circuit input the gate driving signals to the plurality of gate lines GL in the display panel 100 to turn on the plurality of sub-pixels P in the display panel 100 row by row, so that sub-pixels of the first color, which are coupled to a first gate line GL1 of the plurality of gate lines GL, in the plurality of sub-pixels P are turned on simultaneously.

In the same row of sub-pixels P, sub-pixels of the second color are coupled to a second gate line GL2.

Inputting the gate driving signals to the plurality of gate lines GL in the display panel 100 includes inputting gate driving signals to the first gate line GL1 and the second gate line GL2 coupled to the row of sub-pixels P for turning on each TFT in the row of sub-pixels P.

In S102, data signals are input to sub-pixels that are turned on in each row of through the plurality of data lines.

The plurality of data lines DL included in the display panel 100 include first data lines DL1 and second data lines DL2 alternately arranged in the row direction.

In the same row of sub-pixels P, two adjacent sub-pixels P form a sub-pixel pair 230, two sub-pixels P in the same sub-pixel pair 230 are coupled to the same data line DL, and every two adjacent sub-pixel pairs 230 are coupled to a first data line DL1 and a second data line DL2; different sub-pixels P coupled to the same data line DL are coupled to different gate lines GL. For example, in the same row of sub-pixels P, sub-pixels of the first color are coupled to a first gate line GL1, sub-pixels of the second color are coupled to a second gate line GL2, and sub-pixels of the third color are alternately coupled to the first gate line GL1 and the second gate line GL2.

Referring to FIG. 4, a plurality of sub-pixels P located in the same column and having the same color includes first sub-pixels PD1 and second sub-pixels PD2 that are alternately distributed. Each first sub-pixel PD1 is coupled to a first data line DL1, and each second sub-pixel PD2 is coupled to a second data line DL2.

The above method of driving the display panel further includes inputting data signals to sub-pixels P that are turned on in each row through the plurality of data lines DL. In the process where the display panel displays a frame of image, the first data line DL1 and the second data line DL2 transmit data signals with different polarities, and data signals transmitted by each data line DL of the plurality of data lines DL are in the same polarity.

In combination with the above structure of the display panel 100, the above method may realize that, in the process where the display panel 100 displays a frame of image, polarities of sub-pixels P of the same color located in the same row and the same column in the display area AA are different, and the sub-pixels P with the same color and different polarities in the same row and the same column are uniformly arranged, so that the light-emitting brightness may be uniform and a good display effect may be achieved. Since the light-emitting brightness may be uniform in each frame, poor display such as a V-line due to uneven brightness will not occur when a polarity of the same sub-pixel P is reversed in two adjacent frames.

In some embodiments, in a process where the display panel 100 displays two adjacent frames of images, polarities of data signals transmitted by the same data line DL of the plurality of data lines DL are different. For example, FIG. 4 shows polarities of data signals transmitted by the data lines DL in a process where the display panel 100 displays a first frame of image in two adjacent frames of images. It can be seen that polarities of data signals transmitted by first data lines DL1 are all positive, and polarities of data signals transmitted by second data lines DL2 are all negative. In the process of displaying the first frame of image, the polarities of the data signals transmitted by the first data lines DL1 and the second data lines DL2 are opposite and remain unchanged. FIG. 7 shows polarities of data signals transmitted by the data lines DL in a process where the display panel 100 displays a second frame of image in two adjacent frames of images. It can be seen that polarities of data signals transmitted by the first data lines DL1 are converted to be negative, polarities of data signals transmitted by the second data lines DL2 are converted to be positive, and in the process of displaying the second frame of image, the polarities remain unchanged.

If the liquid crystal molecules are always working at a certain constant voltage, properties of the liquid crystal molecules will fail. Once the properties fail, the liquid crystal molecules may no longer respond to a change of an applied voltage even if the constant voltage is cancelled. In the case where the display panel 100 includes liquid crystal molecules, the inversion of the polarities of the data signals transmitted by the same data line DL in a process of displaying two adjacent frames of images may avoid the problem of a failure of physical properties of the liquid crystal molecules, thereby achieving a good display effect and prolonging a service life of the device.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display panel, comprising:
   a plurality of sub-pixels arranged in an array in a row direction and a column direction, each row of sub-pixels including sub-pixels of a first color, sub-pixels of a second color and sub-pixels of a third color;
   a plurality of gate lines including first gate lines and second gate lines alternately arranged in the column direction, a first gate line and a second gate line adjacent to each other forming a gate line pair, two gate lines in the gate line pair being coupled to a same row of sub-pixels, and
   a plurality of data lines including first data lines and second data lines alternately arranged in the row direction, wherein
   in the same row of sub-pixels, sub-pixels of the first color are all coupled to the first gate line;
   in each row of sub-pixels, two adjacent sub-pixels form a sub-pixel pair, two sub-pixels in the sub-pixel pair are coupled to a same data line, every two adjacent sub-pixel pairs are coupled to a first data line and a second data line, different sub-pixels coupled to the same data line are coupled to different gate lines in the gate line pair;
   sub-pixels located in a same column and having a same color include first sub-pixels and second sub-pixels alternately distributed, each first sub-pixel is coupled to a first data line, and each second sub-pixel is coupled to a second data line; and
   the first data lines and the second data lines are configured to transmit data signals with different polarities.

2. The display panel according to claim 1, wherein in the same row of sub-pixels, sub-pixels of the second color are all coupled to the second gate line.

3. The display panel according to claim 1, wherein in a same column of sub-pixels, every two adjacent sub-pixels have different colors.

4. The display panel according to claim 3, wherein in odd rows of sub-pixels, sub-pixels located in the same column have a same color; and
   in even rows of sub-pixels, sub-pixels located in the same column have a same color.

5. The display panel according claim 1, wherein the data line coupled to the sub-pixel pair is located between the two sub-pixels in the sub-pixel pair.

6. The display panel according to claim 1, wherein in two sub-pixel pairs that are coupled to a same data line and located in two adjacent rows of sub-pixels, two sub-pixels in a sub-pixel pair are located in a j-th column and a (j+1)-th column, and two sub-pixels in another sub-pixel pair are located in a (j−1)-th column and the j-th column; the (j−1)-th column, the j-th column and the (j+1)-th column are three consecutive columns.

7. The display panel according to claim 1, wherein
   a data line of the plurality of data lines includes a plurality of data sub-lines connected in sequence, each data sub-line is coupled to Q sub-pixel pairs located in different rows, and i-th sub-pixel pairs each coupled to a data sub-line in the data line are located in the same two columns, wherein i is in a range from 1 to Q, inclusive, and Q is greater than or equal to 2.

8. The display panel according to claim 7, wherein Q is an even number greater than or equal to 4.

9. The display panel according to claim 8, wherein Q is equal to 6.

10. The display panel according to claim 8, wherein among the Q sub-pixel pairs coupled to each data sub-line, a k-th sub-pixel pair and a (Q−k+2)-th sub-pixel pair are located in the same two columns, wherein k is in a range from 2 to Q/2, inclusive.

11. The display panel according to claim 1, wherein the plurality of data lines are arranged in parallel.

12. The display panel according to claim 11, further comprising: a plurality of touch signal lines, at least one of the plurality of touch signal lines being arranged in parallel with a data line.

13. The display panel according claim 1, wherein the sub-pixels of the first color are red sub-pixels, the sub-pixels of the second color are green sub-pixels, and the sub-pixels of the third color are blue sub-pixels.

14. A display apparatus, comprising the display panel according to claim 1.

15. A method of driving a display panel, wherein the display panel includes a plurality of sub-pixels and a plurality of gate lines; the plurality of sub-pixels are arranged in an array in a row direction and a column direction, each row of sub-pixels includes sub-pixels of a first color, sub-pixels of a second color and sub-pixels of a third color; the plurality of gate lines include first gate lines and second gate lines alternately arranged in the column direction, a first gate line and a second gate line are adjacent to each other forming a gate line pair, two gate lines in the gate line pair are coupled to a same row of sub-pixels, wherein in the same row of sub-pixels, sub-pixels of the first color are all coupled to the first gate line;

the method comprises:
inputting gate driving signals to the plurality of gate lines in the display panel in a process where the display panel displays a frame of image to turn on the plurality of sub-pixels in the display panel row by row, so that the sub-pixels of the first color that are coupled to the first gate line of the plurality of gate lines are turned on simultaneously;

wherein the display panel further includes: a plurality of data lines including first data lines and second data lines alternately arranged in the row direction, wherein in each row of sub-pixels, two adjacent sub-pixels form a sub-pixel pair, two sub-pixels in the sub-pixel pair are coupled to a same data line, every two adjacent sub-pixel pairs are coupled to a first data line and a second data line, different sub-pixels coupled to the same data line are coupled to different gate lines in the gate line pair; and sub-pixels located in a same column and having a same color include first sub-pixels and second sub-pixels alternately distributed, each first sub-pixel is coupled to a first data line, and each second sub-pixel is coupled to a second data line;

the method further comprises:
inputting data signals to sub-pixels that are turned on in each row through the plurality of data lines, wherein in the process where the display panel displays the frame of image, the first data lines and the second data lines transmit data signals with different polarities, and data signals transmitted by each data line of the plurality of data lines are in the same polarity.

16. The method according to claim 15, wherein in a process where the display panel displays two adjacent frames of images, polarities of data signals transmitted by the same data line of the plurality of data lines are different.

* * * * *